(12) United States Patent
Sørensen et al.

(10) Patent No.: US 8,085,930 B2
(45) Date of Patent: Dec. 27, 2011

(54) COMMUNICATION SYSTEM

(75) Inventors: Karsten Vandborg Sørensen, Dublin (IE); Jon Bergenheim, Dublin (IE); Koen Vos, Dublin (IE)

(73) Assignee: Skype Limited, Dublin (IE)

( * ) Notice: Subject to any disclaimer, the term of this patent is extended or adjusted under 35 U.S.C. 154(b) by 981 days.

(21) Appl. No.: 12/070,719

(22) Filed: Feb. 20, 2008

(65) Prior Publication Data
US 2009/0185515 A1     Jul. 23, 2009

(30) Foreign Application Priority Data
Jan. 21, 2008   (GB) .................................. 0801108.2

(51) Int. Cl.
*H04M 9/08* (2006.01)
(52) U.S. Cl. .................................. 379/406.04
(58) Field of Classification Search .............. 379/406.04
See application file for complete search history.

(56) References Cited

U.S. PATENT DOCUMENTS

| | | | | |
|---|---|---|---|---|
| 6,650,701 B1 * | 11/2003 | Hsiang et al. | ................. | 375/232 |
| 6,850,783 B1 | 2/2005 | Romesburg | | |
| 7,426,270 B2 * | 9/2008 | Alves et al. | ............... | 379/406.08 |
| 2007/0041575 A1 * | 2/2007 | Alves et al. | ............... | 379/406.08 |
| 2008/0310617 A1 | 12/2008 | Daecke et al. | | |
| 2009/0185674 A1 | 7/2009 | Sorensen et al. | | |

FOREIGN PATENT DOCUMENTS

| | | |
|---|---|---|
| EP | 1 453 244 A2 | 9/2004 |
| JP | 02209027 A | 2/1989 |
| JP | 02-209027 | 8/1990 |
| JP | 10041858 A | 7/1996 |
| WO | WO 00/08837 A1 | 2/2000 |
| WO | WO 2005/009019 A2 | 1/2005 |

OTHER PUBLICATIONS

Great Britain Search Report, GB08/01108.2, date of mailing May 15, 2009.
International Search Report from International Application No. PCT/EP2009/050596, 4 pp., Date Mailed: May 11, 2009.
Written Opinion of the International Searching Authority from International Application No. PCT/EP2009/050596, 7 pp., Date Mailed: May 11, 2009.
International Preliminary Report on Patentability from International Application No. PCT/EP2009/050596, 9 pp., Date Mailed: Aug. 5, 2010.

* cited by examiner

*Primary Examiner* — Alexander Jamal
(74) *Attorney, Agent, or Firm* — Hamilton, Brook, Smith & Reynolds, P.C.

(57) ABSTRACT

A method for removing an echo component in a first signal received at an audio input device, said method comprising the steps of outputting a second signal from an audio output device, receiving at the audio input device the first signal wherein the echo component in the first signal is the result of the second signal traversing an echo path having a frequency response which defines the relationship between the echo component and the second signal; determining an echo path model indicating an estimate of the frequency response of the echo path; removing an estimate of the echo component from the first signal using the echo path model; detecting if the first signal is overloaded; and wherein if it is detected that the first signal is overloaded the step of determining an echo path model comprises determining an overload echo path model such that the estimate of the frequency response indicated by the overload echo path model is only allowed to increase over time regardless of whether the frequency response of the echo path is decreasing over time.

26 Claims, 3 Drawing Sheets

COMMUNICATION SYSTEM

RELATED APPLICATION

This application claims priority under 35 U.S.C. §119 or 365 to Great Britain, Application No. 0801108.2, filed Jan. 21, 2008. The entire teachings of the above application are incorporated herein by reference.

TECHNICAL FIELD

The present invention relates to communication systems. More particularly the present invention relates to a method and apparatus for reducing echo that is present in a signal to be transmitted in a communication system.

BACKGROUND

In a communication system a communication network is provided, which can link together two communication terminals so that the terminals can send information to each other in a call or other communication event. Information may include audio, text, image or video data.

Modern communication systems are based on the transmission of digital signals. Analogue information such as speech is input into an analogue to digital converter at the transmitter of one terminal, hereinafter referred to as the near end terminal, and converted into a digital signal. The digital signal is then encoded and transmitted in data packets over a channel to the receiver of a destination terminal, hereinafter referred to as the far end terminal.

To transmit audio signals, such as speech, analogue audio data is input from a microphone at the near end terminal. The analogue audio data is then converted into digital data before it is transmitted to the far end terminal via the communication network.

A reply signal which is transmitted from the far end terminal, herein after referred to as the far end signal, is received at the near end terminal and output from a loudspeaker of the near end terminal.

A phenomenon commonly referred to as acoustic echo occurs when the far end signal output from the loudspeaker traverses an echo path and is recorded by the microphone of the near end terminal as an acoustic echo component in the near end signal. The echo component in the near end signal may in some cases cause the far end speaker to hear their own voice transmitted back from the near end terminal.

The echo path describes the effects of the acoustic paths travelled by the far end signal from the loudspeaker to the microphone. The far end signal may travel directly from the loudspeaker to the microphone, or it may be reflected from various surfaces in the environment of the near end terminal. The echo path may also describe any other effects that the far end signal has on the near end recording. For example the far end signal may cause mechanical vibration in the near end terminal, or cause electrical induction in the components of the near end terminal.

The echo path traversed by the far end signal output from the loudspeaker may be regarded as a system having a frequency and a phase response which may vary over time. By considering the echo component as the output of the system and the far end signal as the input of the system the frequency response of the echo path is a measure of the gain between the magnitudes of the output and the input of the system as a function of frequency.

FIG. 3 is a graph showing the frequency response of an echo path. The graph shows the gain in decibels (dB) of the output of the system as a function of frequency. The gain will typically be less than one because the echo path will attenuate the signal output from the loudspeaker.

In order to remove the acoustic echo from the signal recorded at the near end microphone it is necessary to estimate how the echo path changes the desired far-end loudspeaker output signal to an undesired echo component in the input signal. The effects of the echo path are estimated by calculating a mathematical representation of the relation between the signal output from the loudspeaker and the undesired echo input signal. The mathematical representation of the combined effects of the frequency and phase response which describes the echo path are hereinafter referred to as the echo path transfer function. When the echo path transfer function is accurately determined, the frequency response of the echo path transfer function will be equivalent to the frequency response of the actual echo path.

The echo path transfer function H(s) is the linear mapping of the Laplace transform X(s) of the far end signal to the Laplace transform Y(s) of the echo signal:

$$Y(s) = H(s)X(s) \qquad \text{Equation (1)}$$

or $$H(s) = \frac{Y(s)}{X(s)} = \frac{L\{y(t)\}}{L\{x(t)\}} \qquad \text{Equation (2)}$$

The echo path transfer function H(s) is calculated by comparing the far end loudspeaker signal with the near end signal recorded by the microphone. When the near-end speaker is silent and the far-end speaker is active, only the echo provided by the far end signal is recorded by the near end microphone. In this case, the echo path transfer function can be adaptively calculated to model the way that the far-end signal changes when traversing the echo path.

In known acoustic echo cancellation (AEC) techniques the adaptively calculated echo transfer function is used to provide filter coefficients that filter the far end signal to generate an estimate of the echo component in the near end signal in accordance with the echo path transfer function. The estimated echo may then be subtracted from the near end signal. Other AEC techniques employ attenuation based filtering methods that attenuate the near end signal according to the calculated echo path transfer function to remove the echo component from the near end signal.

If the near-end signal is overloaded this causes a non linear distortion of the near end signal which substantially affects the accuracy of the calculated echo path transfer function by a tendency to underestimate the frequency response. As a result the residual echo in the near end signal transmitted to the far end terminal is likely to be high immediately after the overload. A signal overload occurs when the components of the terminal in the signal processing path are subjected to a greater load than they were designed to handle. A signal overload may be caused by a sudden increase in the signal power, a high gain setting, or by a slow reacting automatic analogue gain control. Signal overload is most likely to happen while the terminal transmitting the signal is adapting its settings during the initial stages of the communication.

Immediately after a signal overload occurs, the adaptive calculation of the echo path transfer function will take time to adapt to the non overloaded signal. During this time the echo component removed from the near end signal will be inaccurate and can cause an echo to appear at the far end terminal.

In some prior art methods, such as that disclosed in U.S. Pat. No. 6,850,783, the coefficients of the filters are prevented from adapting during periods of overload. This prevents the calculation of the echo path transfer function from altering during the overload period.

Whilst this method may prevent the echo estimation from significantly worsening during the overload, the presence of a high residual echo is not eliminated either during the overload or immediately afterward.

It is therefore an aim of the, present invention to overcome the problems presented by the prior art and to reduce the echo present in the transmitted signal during and immediately following signal overload.

SUMMARY

According to a first aspect of the present invention there is provided a method for removing an echo component in a first signal received at an audio input device, said method comprising the steps of: outputting a second signal from an audio output device, receiving at the audio input device the first signal wherein the echo component in the first signal is the result of the second signal traversing an echo path having a frequency response which defines the relationship between the echo component and the second signal; determining an echo path model indicating an estimate of the frequency response of the echo path; removing an estimate of the echo component from the first signal using the echo path model; detecting if the first signal is overloaded; and wherein if it is detected that the first signal is overloaded the step of determining an echo path model comprises determining an overload echo path model such that the estimate of the frequency response indicated by the overload echo path model is only allowed to increase over time regardless of whether the frequency response of the echo path is decreasing over time.

According to a second aspect of the present invention there is provided a system arranged to remove an echo component in a first signal received at an audio input device wherein the echo component in the first signal is the result of a second signal output from an audio output device traversing an echo path having a frequency response which defines the relationship between the echo component and the second signal, said system comprising: an echo canceller arranged to determine an echo path model indicating an estimate of the frequency response of the echo path and to remove an estimate of the echo component from the first signal using the echo path model; an overload detector arranged to detect if the first signal is overloaded; wherein if it is detected that the first signal is overloaded the echo canceller is arranged to determine an overload echo path model such that the estimate of the frequency response indicated by the overload echo path model is only allowed to increase over time regardless of whether the frequency response of the echo path is decreasing over time.

According to a third aspect of the present invention there is provided a method for attenuating an echo component of a received signal, wherein the echo component is based on an echo path frequency response of a source signal, the method comprising estimating the echo path frequency response; determining an estimate of the echo component based on the estimated echo path frequency response; determining whether the first signal is overloaded; and attenuating the echo component of the received signal based on the determined echo component estimate, wherein when the determination is positive, forcing the estimated echo path frequency response to increase over time regardless of whether the echo path frequency response is decreasing over time.

BRIEF DESCRIPTION OF THE DRAWINGS

For a better understanding of the present invention and to show how the same may be carried into effect, embodiments of the present invention will now be described with reference to the following drawings.

DETAILED DESCRIPTION

Figure 1:
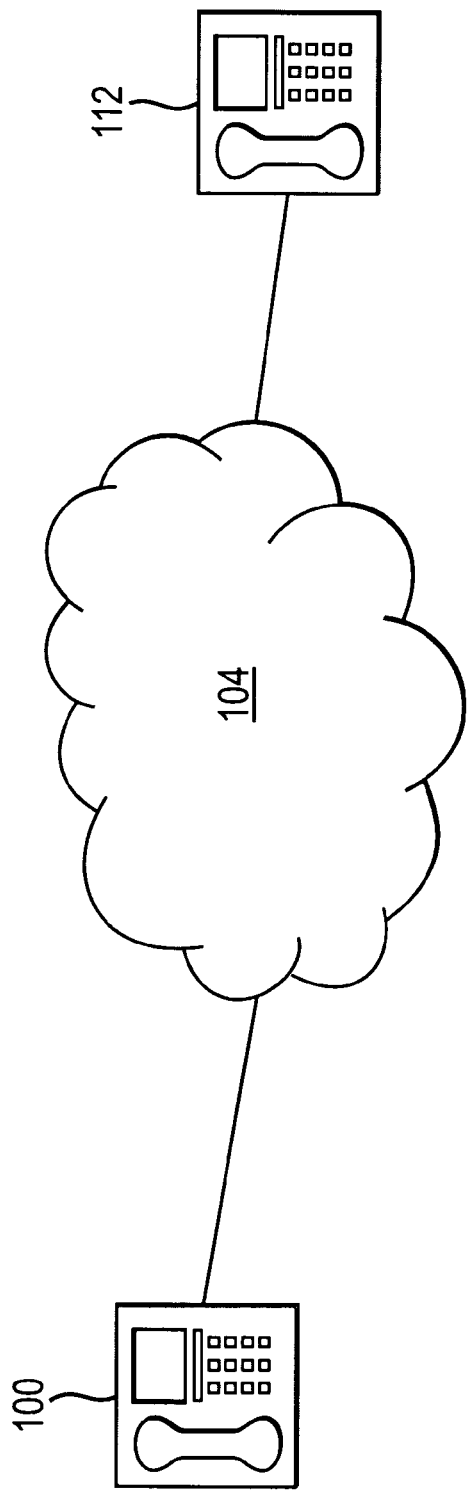
FIG. 1 is a diagram showing a near end terminal and a far end terminal connected to a communication network.
Figure 3:
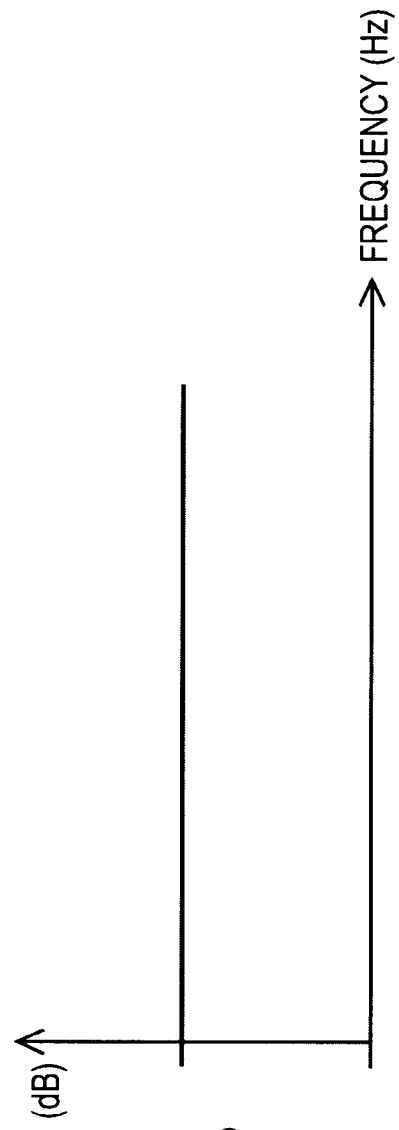
FIG. 3 is a graph illustrating the frequency response of a system.

Reference will first be made to FIG. 1, in which is shown a near end terminal 100 and a far end terminal 112 connected to a communication network 104. The near end terminal 100 and the far end terminal 112 are arranged to transmit information to each other via the communication network 104. In one embodiment of the invention the communications network is a VoIP (Voice Over Internet Protocol) network provided by the internet. It should be appreciated that even though the exemplifying communications system shown and described in more detail herein uses the terminology of a VoIP network, embodiments of the present invention can be used in any other suitable communication system that facilitates the transfer of data. Embodiments of the invention are particularly suited to asynchronous communication networks such as frame based systems as ATM, Bluetooth™ and Enhanced Data rates for GSM Evolution (EDGE) networks. IEEE 802.16 systems and any time slotted communication system.

The terminals 100 and 112 may be connected to the network 104 via a cable (wired) connection or a wireless connection. The terminals 100 and 112 may be, for example, a personal computer, a gaming device, a personal digital assistant, a suitably enabled mobile phone, a television or any other device able to connect to the network 104.

Figure 2:
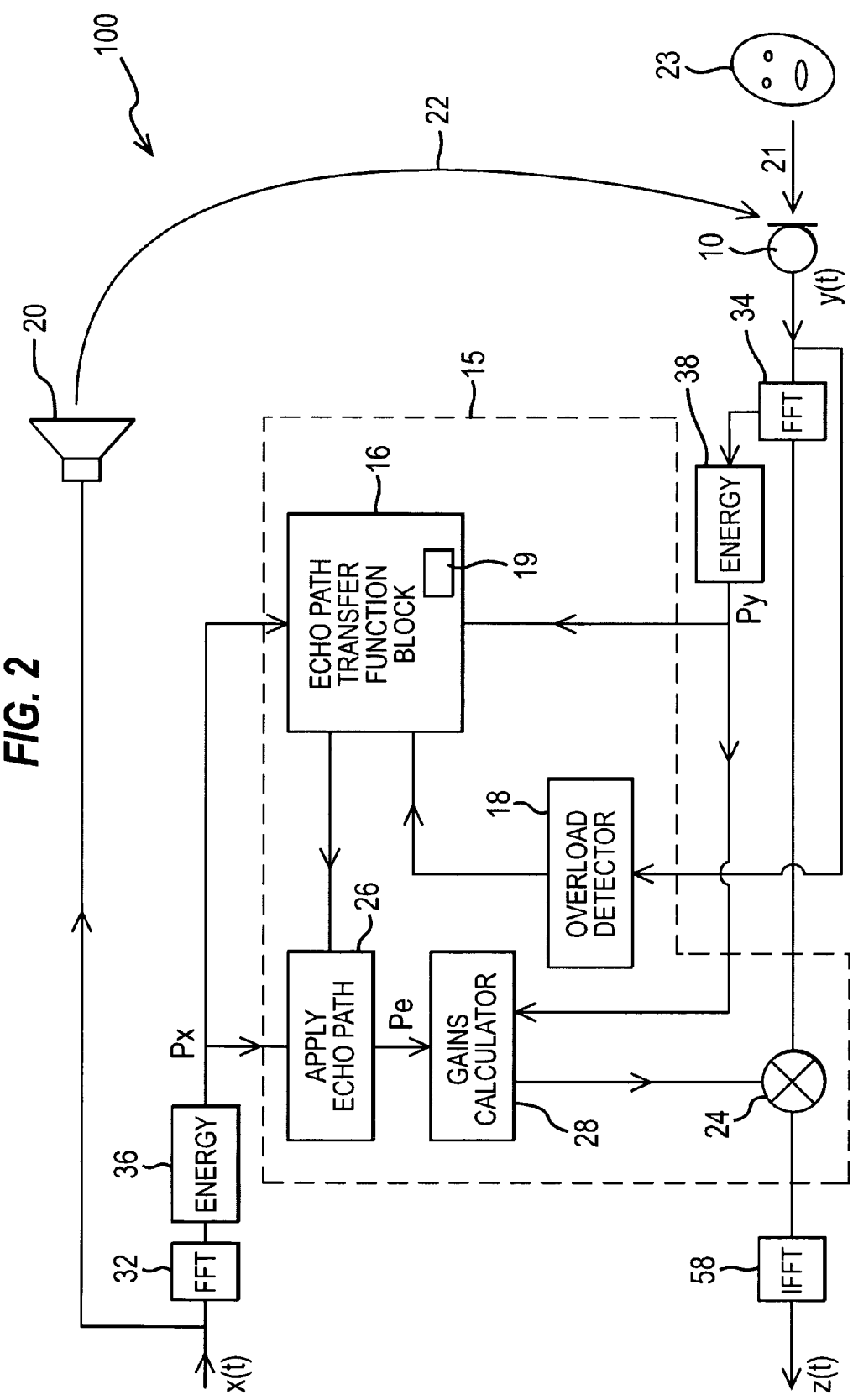
FIG. 2 is a diagram of a near end terminal according to an embodiment of the present invention.

FIG. 2 shows the near end terminal 100 in more detail. The near end terminal comprises a microphone 10, a far end and near end Fast Fourier Transform (FFT) blocks 32 and 34, far end and near end energy blocks 36 and 38, an AEC block 15 and a loudspeaker 20. The AEC block 15 comprises an echo path transfer function block 16, an apply echo path block 26, a gains calculator block 28, an apply gains block 24 and an overload detector block 18. Each of these components may be implemented as hardware in the terminal or as software running on a processor in the terminal. This is an implementation preference.

The terminal 100 is arranged to receive a far end signal x(t) transmitted from the far end terminal 112 via the network 104. Alternatively the signal x(t) may comprise any information generated at the near end terminal that is output via the loudspeaker 20, for example speech synthesis of text, playback of a recording, voice mail, or ring tones.

The microphone 10 receives an input near end signal y(t) which comprises a near end component 21 such as speech input from a user 23 of the terminal 100 and background noise, and an echo component 22 resulting from the far end signal x(t) after it has traversed the echo path.

The AEC block is arranged to apply a gain to the near end signal y(t) to remove an estimate of the echo component. The estimate of the echo component removed from the near end signal is provided by an echo path model determined by the AEC block. The operation of the AEC block will be described hereinafter.

The terminal 100 outputs a signal z(t) to be transmitted to the far end terminal via the network 104. The output signal z(t) is the resulting signal after the echo component 22 has been removed or reduced from the near end signal y(t).

The near end signal y(t) is input into the near end FFT block 34. The near end FFT block transforms the near end time domain signal y(t) into a frequency domain signal.

The far end signal x(t) is input into the far end FFT block 32. The far end FFT block transforms the far end time domain signal x(t) into a frequency domain signal.

The far end frequency domain signal output from the far end FFT block 32 is input into the far end energy block 36. The energy block 36 squares the magnitudes of the far end frequency domain signal to produce a far end power spectrum signal Px. The far end power spectrum signal output from the far end energy block is then input into the echo path transfer function block 16 and the apply echo path block 26.

In the same way, the near end frequency domain signal output from the near end FFT block 34 is input into the near end energy block 38. The near end energy block 38 squares the magnitudes of the near end frequency domain signal to produce a near end power spectrum signal Py. The near end power spectrum signal output from the near end energy block is then also input into the echo path transfer function block 16.

The echo path transfer function block 16 is arranged to compare the far end power spectrum signal Px and the near end power spectrum signal Py on a frame by frame basis to adaptively calculate the echo path transfer function H(s) according to Equation 2 stated above.

It will be appreciated by one skilled in the art that the echo path transfer function H(s) does not need to be explicitly calculated, but could be represented by means of coefficients obtained from algorithms such as Least Mean Squares (LMS), Normalized Least Mean Squares (NLMS), and Recursive Least Squares (RLS).

A voice activity detector (VAD) (not shown) is arranged to control the adaptation of the echo path transfer function. An input from the VAD is provided to indicate to the echo path transfer function block 16 when the near-end component 21 is inactive and the far-end signal is active. In one embodiment the echo path transfer function block 16 is arranged to only adapt the calculation of the echo path transfer function H(s) when the near end speaker 23 is silent and the far end speaker is active. As such the echo path transfer function block 16 may update the echo path transfer function by comparing the near end signal Py and the far end signal Px when only echo is present in the near end signal Py.

The echo path transfer function block is arranged to output echo path gains representing the echo path transfer function to the apply echo path block 26. The apply echo path block 26 is arranged to apply the echo path gains to each frequency of the far end power spectrum signal Px to generate a power spectrum signal Pe estimate of the echo component 22 in the near end power spectrum signal Py.

The estimate of the echo component Pe output from the apply echo path block 26 is input into a gains calculator block 28. The gains calculator block 28 is arranged to compare the power spectrum signal Pe with the power spectrum signal Py to calculate a gain for each frequency band to be applied to the near end signal at the apply gains block 24. In one embodiment the gains may be determined in the gains calculator 28 by calculating one minus the ratio of the power of the signal Pe to the signal Py for each frequency band on a frame by frame basis.

The gains are applied to the near end Fourier spectrum signal output from the FFT block 34 at the apply gains block 24. The magnitude of the gains will necessarily be less than or equal to 1. As such the gains will attenuate the power in the near end Fourier spectrum signal to remove the echo signal component.

The echo reduced near end Fourier spectrum is then input into an Inverse Fast Fourier transform (IFFT) block 58. The IFFT block 58 transforms the attenuated near end Fourier spectrum signal to the time domain to produce the output signal z(t) to be transmitted to the far end terminal 112.

According to an embodiment of the invention the AEC block 15 comprises an overload detector 18 that is arranged to detect an overload condition in the near end signal. The near end signal y(t) is said to be overloaded when the signal y(t) subjects components in the terminal 100, such as the microphone 10 and other components processing the near end signal to a load that exceeds the load that the components were designed to handle. This causes a non linear distortion of the near end signal. In particular the amplitude of the signal output from the components processing the near end signal becomes clipped.

Clipping prevents the near end signal that is processed by the components in the terminal 100 from accurately representing the peak amplitudes present in the near end signal y(t) input into the microphone. In particular the echo component of the near end signal will be underestimated during an overload. Therefore a residual echo may be present in the signal z(t) immediately after the period during which the near end signal is overloaded.

According to an embodiment of the invention, during overload of the near end signal the AEC 15 is arranged to determine an overload echo path model. During overload, the AEC is arranged to determine the overload echo path model by constraining the estimate of the frequency response of the echo path to increase or stay the same over time. The frequency response at a given frequency is said to be increasing when the power of the output signal at the given frequency, is an increasing proportion of the power of the input signal at the given frequency. The estimate of the frequency response of the echo path is said to be increasing if the frequency response at at least one frequency is increasing. In this case the output signal is the echo component removed from the near end signal and the input signal is the far end signal. In a preferred embodiment of the invention the frequency response of the remaining frequencies are prevented from decreasing.

The AEC 15 may determine the overload echo path model by constraining the power of the echo component removed from the near end signal Py to be a non decreasing proportion of the power of the far end signal Px when the near end signal is overloaded. As such the power of the echo component removed from the near end signal is only allowed to be an increasing or equal proportion of the power of the far end signal during overload of the near end signal. This reduces the likelihood of underestimation of the echo component in the near end signal during and immediately after overload of the near end signal, while maintaining full convergence speed for an increasing estimated frequency response. This is of particular importance when the echo path estimate has not yet fully converged and is underestimated before the overload condition occurs. In this case, the estimated echo path would benefit from converging under the constraint of a non-decreasing frequency response.

As shown in FIG. 2 the AEC block 15 comprises an overload detector block 18. The overload detector block 18 receives the near end signal y(t) and is arranged to detect an overload condition in the signal y(t). In one embodiment of the invention the overload detector block 18 is arranged to output a signal indicating an overload condition to the echo path transfer function block 16.

An overload condition of the near end signal y(t) may be detected by comparing a characteristic of the signal y(t), such as signal energy or amplitude to a predetermined threshold. If the characteristic of the signal exceeds the threshold an overload condition is detected.

In one embodiment of the invention an echo path estimation constrainer 19 is provided in the AEC block 15. The echo path estimation constrainer 19 is arranged to constrain the estimate of the frequency response to either increase or remain constant during overload.

According to one embodiment of the invention the echo path estimation constrainer 19 is arranged to constrain the estimate of the frequency response of the actual echo path by constraining the power of the estimated echo component such that the power of the echo component removed is only allowed to be an increasing or equal proportion of the power of the far end signal during overload of the near end signal.

According to one embodiment of the invention the echo path estimation constrainer 19 is arranged to constrain the estimate of the frequency response of the echo path to be non decreasing by modifying the echo component Pe or the power spectrum Py before they are compared in the gain calculator block. For example increasing the magnitude of the echo component Pe relative to the magnitude of the power spectrum Py will cause the estimate of the frequency response of the echo path to increase.

The frequency response of the echo path transfer function determined by block 16 changes as the echo path transfer function is adapted. According to one embodiment of the invention the estimate of the frequency response of the echo path may be constrained to be non decreasing by constraining the frequency response of the echo path transfer function determined in block 16 to remain constant or to increase during overload of the near end signal.

In the embodiment of the invention shown in FIG. 2 the echo path estimation constrainer 19 is provided in the echo path transfer function block 16.

When the overload detection block indicates that the near end signal is overloaded the echo estimate constrainer 19 is arranged to control the echo path transfer function to be applied at the apply echo path block 26 such that the frequency response of the echo path transfer function is non decreasing. This may be achieved for example by selectively providing the gains to the apply echo path block 26.

The inventors of the present invention have identified that overload of the near end input signal y(t) is likely to occur at the beginning of the communication between the near end and the far end terminal. This is because settings such as analogue gain levels, digital gain levels and boost settings have not had time to adjust to their optimum levels at the beginning of the communication.

Furthermore, if the actual echo path frequency response is high at the beginning of the communication, the initial frequency response of the echo path transfer function is likely to be lower than the frequency response of the actual echo path travelled by the echo signal 22. This results in a residual echo in the output signal z(n), when the far end speaker is active.

During a call, manual increases of the loudspeaker volume in a hands-free setup can also lead to overload in the near end input signal. In this case the echo path frequency response would be underestimated immediately after the overload condition as the volume increase will increase the frequency response of the echo path. The current invention would allow the estimated frequency response to adapt towards the changed echo path frequency response during the overload.

The inventors of the present invention have found that during overload, better performance can be obtained by forcing the estimation of the frequency response of the actual echo path to increase. This may be achieved by forcing an increase in the frequency response of the echo path transfer function during overload.

In one embodiment of the invention the frequency response of the echo transfer function may be forced to increase by modifying the echo path gains after they have been derived. In the above embodiment this may be done by applying a multiplication factor to the echo path gains applied to at least some of the frequency bands of the far end power spectrum signal Px.

In an alternative embodiment of the invention the frequency response of the echo path transfer function may be increased by modifying either the near end power spectrum or the far end power spectrum before the signals are compared to determine the echo path transfer function.

It should be appreciated that the estimate of the frequency response of the echo path may be implicitly constrained by constraining the characteristics of the echo component removed by attenuation of the near end signal. As such an estimation of frequency response of the echo path need not be directly determined for the purposes of carrying out the present invention. This is illustrated by the following embodiment of the present invention as shown in FIG. 4.

Figure 4:
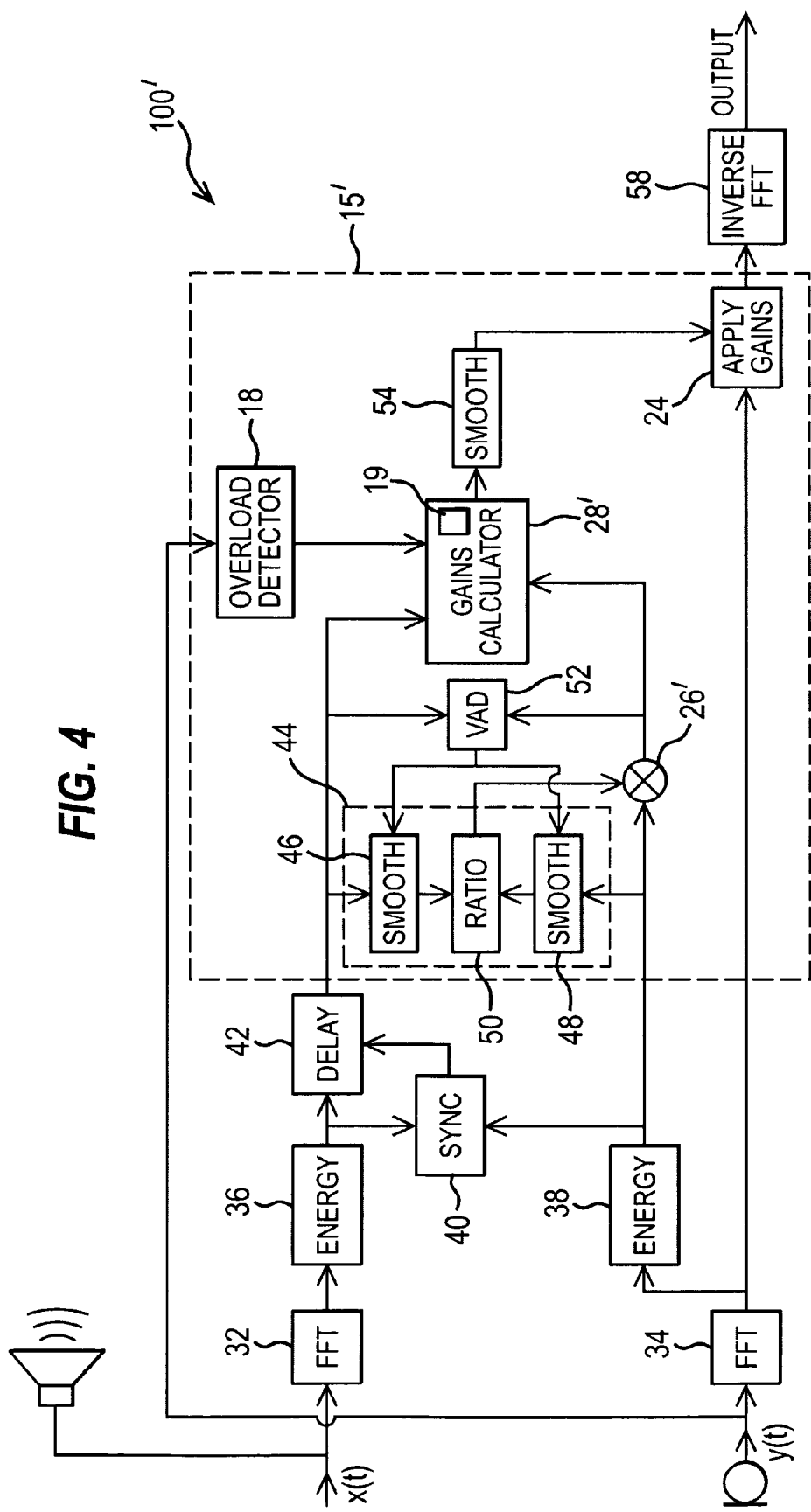
FIG. 4 is a diagram of a near end terminal according to a further embodiment of the present invention.

Reference will now be made to FIG. 4 which describes a near end terminal 100" according to a preferred embodiment of the invention. The components that have been described in relation to previous embodiments of the invention are referred to in FIG. 4 using like reference numerals.

The near end terminal 100" shown in FIG. 4 comprises far end and near end Fast Fourier Transform (FFT) blocks 32 and 34, far end and near end energy blocks 36 and 38, a synchronization block 40, a delay block 42, an AEC block 15" and an inverse FFT block 58. Each of these components may be implemented as hardware in the terminal or as software running on a processor in the terminal.

The far end FFT block 32 is arranged to receive the far end signal x(t) received from the far end terminal 112. Similarly the near end FFT block 34 is arranged to receive the near end signal y(t) from the microphone 10. The far end signal and the near end signal are each transformed into frequency domain signals in the FFT blocks 32 and 34 respectively.

The far end frequency domain signal output from the far end FFT block 32 is input into the far end energy block 36. The energy block 36 squares the magnitudes of the far end frequency domain signal to produce a far end power spectrum signal. The far end power spectrum signal output from the far end energy block is then input into the synchronization block 40.

In the same way, the near end frequency domain signal output from the near end FFT block 34 is input into the near end energy block 38. The near end energy block 38 squares the magnitudes of the near end frequency domain signal to produce a near end power spectrum signal. The near end power spectrum signal output from the near end energy block is then also input into the synchronization block 40.

The synchronization block 40 is arranged to analyze the far end and near end power spectrum signals to determine the delay between the far end signal and the far end signal transformed by the echo path present in the near end signal. This may be achieved by correlating the maximum energy points in the near end and far end power spectrum signals when the far end speaker is active and the near end speaker is inactive.

The synchronization block 40 is arranged to output the determined delay to the delay block 42. The delay block 42 receives the far end power spectrum from the energy block 36. The delay block 42 is arranged to delay the far end power spectrum signal by the amount determined by the synchronization block 40. The delay applied by the delay block 42 compensates for the delay caused by the echo path traversed by the far end signal before it is recorded by the microphone 10 as echo.

The delayed far end power spectrum signal output from the delay block 42 is input to the AEC block 15' together with the near end power spectrum signal output from the energy block 38.

The AEC block 15' comprises an inverse echo path transfer function block 44, a Voice Activity Detector (VAD) block 52, an attenuation gains calculator 28', a smoothing filter 54 and an apply inverse echo path block 26'. Each of these components may be implemented as hardware in the terminal or as software running on a processor in the terminal.

The far end and near end power spectrum signals input into the AEC block 15' are input into the inverse echo path transfer function block 44. The inverse echo path transfer function block comprises smoothing filters 46 and 48, and a ratio block 50. The far end power spectrum is input into the smoothing filter 46 and the near end power spectrum is input into the smoothing filter 48. The inverse echo path transfer function block is also arranged to receive an input from the VAD block 52 which is input into both the smoothing filters 46 and 48.

The smoothing filters 46 and 48 are arranged to smooth the far end power spectrum and the near end power spectrum respectively. The VAD 52 is arranged to control the update rate of the smoothing filters 46 and 48. The operation of the VAD will be described hereinafter.

The update rate of each smoothing filter defines how quickly the output of the filter follows the input of the filter. The input from the VAD 52 controls the update rate of the smoothing filters 46 and 48 such that if speech is only detected on the far end signal, the update rate of the filters is controlled to be high, and as such the smoothing applied by the smoothing filters 46 and 48 is low. In all other cases the VAD controls the update rate of the filters 46 and 48 to be low, and as such the smoothing applied by the filters will be high. As a result, the outputs from the smoothing filters 46 and 48 are substantially determined by the state of the far end power spectrum and the near end power spectrum that are input into the filters 46 and 48 when only echo exists in the near end signal.

The smoothing applied by the smoothing filters 46 and 48 can be expressed mathematically as:

$$Sx(k, t) = (1-a) Sx(k, t-1) + a Px(k, t) \quad \text{Equation (3)}$$

$$Sy(k, t) = (1-a) Sy(k, t-1) + a Py(k, t) \quad \text{Equation (4)}$$

where Sx and Sy are the smoothed far end and near end power spectra respectively, Px and Py are the unsmoothed far end and near end power spectra respectively, k is the frequency band at time t and a is the update rate.

The outputs from the smoothing filters 46 and 48 are input into the ratio block 50. The ratio block 50 is arranged to compare a frame of the smoothed near end power Sy with a frame of the smoothed far end power spectrum Sx determine the ratio of the smoothed near end-to-far end power for each frequency band.

The ratio block 50 may also be arranged to add a bias to the ratios to provide robustness against underestimation of the smoothed far end power spectrum. This underestimation may for instance happen early on in a call when the far end speaker has not spoken much yet, and can lead to over-attenuation of the near end signal in a subsequent stage, distorting the near end speaker's voice.

The biased ratios output from the ratio block of the inverse echo path transfer function block 44 describe the inverse echo path gain for each frequency band. That is, the ratios describe the inverse of the proportion of the far end power spectrum that is present in the near end power spectrum as echo. The inverse echo path gain is described in Equation (3) as:

$$H\text{inv}(k) = Sx(k)/Sy(k) + \text{bias}(k) \quad \text{Equation (5)}$$

where Hinv(k) is the inverse echo path gain for frequency band k (the time index has been omitted).

The inverse echo path gains output from the inverse echo path transfer function block 44 are input into the apply inverse echo path block 26'. The apply inverse echo path block 26' is also arranged to receive the unsmoothed near end power spectrum output from the near end energy block 38. The inverse echo path gains are multiplied with the unsmoothed near end power spectrum in the apply inverse echo path block 26'. Multiplying the inverse echo path gains with the unsmoothed near end power spectrum produces an estimate of a hypothetical far end power spectrum that would have created the observed near end power spectrum after passing through the echo path if no near end speech from user 23 is present. This results in an equalized near end power spectrum, which can be directly compared to the far end power spectrum to determine the proportion of the far end signal that is present as echo in the near end signal. The equalized near end power spectrum is defined in Equation (6) as:

$$Peqy(k) = H\text{inv}(k) \, Py(k) \quad \text{Equation (6)}$$

where Peqy(k) is the equalized near end power spectrum output from the apply inverse echo path block 26.

The equalized near end power spectrum output from the apply inverse echo path block 26 is input into the gains calculator 28'. The gains calculator also receives the far end power spectrum signal as an input from the delay block 42.

The gains calculator 28' is arranged to calculate the gain in each band according Equation (7):

$$G(k) = 1 - \min(\max(Px(k)/Peqy(k), 0), 1) \quad \text{Equation (7)}$$

where G(k) is the gain, Px(k) is the far end power spectrum and Peqy(k) is the equalized near end power spectrum for a frequency k. As shown by Equation 7 above, the gains calculated in the gains calculator 28' cannot exceed 1 or fall below zero. As such when the gain G(k) is applied to the near end signal at the frequency k the near end signal at the frequency k will be attenuated or stay the same.

The gains output from the gains calculator 28' are input to the smoothing filter 54. The smoothing filter 54 is arranged to smooth the gains over both time and frequency to prevent artefacts from occurring due to large fluctuations in the gains.

The smoothed gains are output from the smoothing filter and input into the apply gains block 24. The apply gains block 24 also receives the near end Fourier spectrum from the near end FFT block 34. The apply gains block 24 is arranged to apply the smoothed attenuation gains to the near end Fourier spectrum by multiplying each gain with the corresponding frequency band of the near end Fourier spectrum.

The attenuated near end Fourier spectrum is output from the apply gains block 24 and input into the inverse FFT block 58. The inverse FFT block 58 transforms the attenuated near end Fourier spectrum into the time domain to produce the output signal to be transmitted to the far end terminal 112.

The operation of the VAD 52 to determine the update speed of the smoothing filters 46 and 48 will now be described.

The VAD 52 receives the far end power spectrum Px and the equalized near end power spectrum Peqy as inputs. The VAD is arranged to divide each power spectrum Px and Peqy into three voicing bands, 0-2 kHz, 2-4 kHz and 4-8 kHz for speech, sampled at 16 kHz.

The VAD determines the average energy of the frequency bands within each voicing band. The VAD is also arranged to estimate the average noise level within each voicing band. From the average energy and the average noise level the VAD may determine the Signal-to-Noise Ratio (SNR) value in each voicing band. The SNR values for the three voicing bands are averaged to produce the average SNR for the far end power spectrum and the equalized near end power spectrum respectively.

By comparing the far end and near end average SNR values, the VAD is arranged to determine the appropriate update rate for the smoothing filters 46 and 48. The update rate is set high if the following two conditions are both met:
1) the far end average SNR is high, and
2) the near end average SNR is not higher than the far end average SNR.

If condition (1) is met this ensures that the smoothing filters 46 and 48 are updated only when speech is likely to be present in the far end signal. If condition (2) is met this ensures that the smoothing filters 46 and 48 are updated when the near end signal only contains echo. That is condition (2) is used to avoid updating the smoothing filters 46 and 48 when both the user of the near end terminal 100 and the far end terminal 112 are speaking simultaneously.

In accordance with an embodiment of the invention shown in FIG. 4 the overload detector 18 is arranged to indicate an overload condition in the near end signal to the gains calculator 28'. The overload detector 18 receives the near end signal y(t) from the microphone 10. When an overload condition is detected in the near end signal the overload detector 18 is arranged to output an overload detection signal to the gains calculator 28'.

An echo path estimation constrainer 19 located at the gains calculator 28 is arranged to constrain the power of the echo component removed from the near end signal by controlling the output of the gains calculator in response to the overload condition indicated by the overload detector.

According to an embodiment of the invention, if an overload condition is detected by the overload detector block 18; the echo path estimation constrainer 19 is arranged to control the calculation of the gains for each band of the near end Fourier spectrum such that the power of the echo component removed from the near end signal is constrained to be a non decreasing proportion of the power of the far end signal.

In one embodiment of the invention the calculation of the gains is controlled by preventing the gains from increasing over time during a detected overload of the near end signal. As such, the amount of echo attenuation in each band is the same or higher than in the previous frame during the overload condition. One way of enforcing this constraint during an overload is by limiting the gain for each frequency k to be non-increasing over time by outputting the minimum of each newly calculated gain, and the previous one, i.e., $$G(k,t) = \min(G(k,t), G(k, t-1))$$ Equation (8)

In one embodiment of the invention the echo estimate constrainer 19 may also be arranged to constrain the attenuation gains to be non-increasing for a predetermined period after the overload condition has been detected. In a preferred embodiment of the invention the echo estimation constrainer 19 may constrain the attenuation gains for 500 ms after the overload condition has occurred. The reason for imposing the constraint of 500 ms after the overload condition is to ensure that smoothed values have recovered from the non-linear distortion caused by the overload before an unconstrained estimation is allowed.

In an alternative embodiment of the invention the echo path estimate constrainer may be provided in the inverse echo path transfer function block 44. In this embodiment of the invention the overload detector block is arranged to output an indication of an overload condition to the echo path estimation constrainer 19 in the inverse echo transfer function block 44. The echo path estimation constrainer 19 is arranged to control the calculation of the inverse echo transfer function during overload such that the power of the echo component removed from the near end signal is constrained to be a non decreasing proportion of the power of the far end signal. This may be achieved by decreasing the frequency response of the applied inverse echo transfer function. In one embodiment of the invention the frequency response of the inverse echo transfer function applied to the near end signal, may be decreased by selectively providing only decreasing inverse echo path gains to the apply inverse echo path block 26 during overload.

It should be appreciated that the echo path model described above indicates an estimation of the echo path traversed by the far end signal. The echo path model is determined by applying an estimation method as described above to the available data, such as that provided by the near end and far end signals.

While this invention has been particularly shown and described with reference to preferred embodiments, it will be understood to those skilled in the art that various changes in form and detail may be made without departing from the scope of the invention as defined by the claims.

What is claimed is:

1. A method for removing an echo component in a first signal received at an audio input device, said method comprising the steps of:
   outputting a second signal from an audio output device,
   receiving at the audio input device the first signal wherein the echo component in the first signal is the result of the second signal traversing an echo path having a frequency response which defines the relationship between the echo component and the second signal;
   determining an echo path model indicating an estimate of the frequency response of the echo path;
   removing an estimate of the echo component from the first signal using the echo path model;
   detecting if the first signal is overloaded; and
   wherein if it is detected that the first signal is overloaded, the step of determining an echo path model comprises determining an overload echo path model such that the estimate of the frequency response indicated by the overload echo path model is only allowed to increase over time regardless of whether the frequency response of the echo path is decreasing over time.

2. A method as claimed in claim 1 wherein the step of determining the echo path model comprises applying an estimation method to the first signal and the second signal.

3. A method as claimed in claim 2 wherein the step of applying the estimation method comprises;
   detecting if the first signal comprises only the echo component;

determining an estimate of a proportion of the second signal that is equivalent to the echo component in the first signal by comparing the first signal and the second signal when it is detected that the first signal only comprises echo; and determining an estimate of a proportion of the first signal comprising the echo component based on the estimate of the proportion of the second signal that is equivalent to the echo component, wherein the echo path model is indicated by the estimate of the proportion of the first signal comprising the echo component.

4. A method as claimed in claim 3 wherein the step of determining the estimate of the proportion of the second signal that is equivalent to the echo component comprises determining a transfer function.

5. A method as claimed in claim 4 wherein the step of determining an estimate of a proportion of the first signal comprising the echo component based on the estimate of the proportion of the second signal that is equivalent to the echo component comprises determining a gain to be applied to the first signal.

6. A method as claimed in claim 5 wherein the step of removing the estimate of the echo component comprises applying the gain to the first signal.

7. A method as claimed in claim 6 where in the gain applied to the first signal is less than or equal to one.

8. A method as claimed in claim 5 wherein the method further comprises the step of;
applying the transfer function to the first signal to determine an equalised first signal.

9. A method as claimed in claim 8 wherein the step of determining the gain comprises comparing the equalised first signal to the second signal.

10. A method as claimed in claim 5 wherein the method further comprises the step of;
applying the transfer function to the second signal to determine the estimate of the echo component.

11. A method as claimed in claim 10 wherein the step of determining the gain comprises comparing the estimate of the echo component to the first signal.

12. A method as claimed in claim 4 wherein the step of determining the overload echo path model comprises adapting the estimation method.

13. A method as claimed in claim 12 wherein the step of adapting the estimation method comprises adapting the transfer function to indicate that an increasing proportion of the second signal is equivalent to the echo component when the first signal is overloaded.

14. A method as claimed in claim 12 wherein the step of adapting the estimation method comprises adapting the gain such that the estimate of the echo component removed from the first signal is an increasing proportion of the second signal when the first signal is overloaded.

15. A method as claimed in claim 1 wherein the first signal and the second signal are converted to a first power spectrum signal and a second power spectrum signal respectively.

16. A system arranged to remove an echo component in a first signal received at an audio input device wherein the echo component in the first signal is the result of a second signal output from an audio output device traversing an echo path having a frequency response which defines the relationship between the echo component and the second signal, said system comprising:
an echo canceller arranged to determine an echo path model indicating an estimate of the frequency response of the echo path and to remove an estimate of the echo component from the first signal using the echo path model;
an overload detector arranged to detect if the first signal is overloaded;
wherein if it is detected that the first signal is overloaded the echo canceller is arranged to determine an overload echo path model such that the estimate of the frequency response indicated by the overload echo path model is only allowed to increase over time regardless of whether the frequency response of the echo path is decreasing over time.

17. A system as claimed in claim 16 wherein the echo canceller is arranged to apply an estimation method to determine the echo path model and wherein the echo canceller comprises an estimation adapter arranged to adapt the estimation method if it is detected that the first signal is overloaded such that the overload echo path model is determined.

18. A system as claimed in claim 17 wherein the echo canceller further comprises:
a detector arranged to detect if the first signal comprises only the echo component;
a first ratio block arranged to determine an estimate of a proportion of the second signal that is equivalent to the echo component in the first signal by comparing the first signal and the second signal when it is detected that the first signal only comprises echo; and
a second ratio block arranged to determine an estimate of a proportion of the first signal comprising the echo component based on the estimate of the proportion of the second signal that is equivalent to the echo component; wherein the echo path model is indicated by the estimate of the proportion of the first signal comprising the echo component.

19. A system as claimed in claim 18 wherein the first ratio block is a transfer function block.

20. A system as claimed in claim 19 wherein the transfer function block is arranged to determine a transfer function indicating the estimate of the proportion of the second signal that is equivalent to the echo component in the first signal.

21. A system as claimed in claim 18 wherein the second ratio block is a gains calculator.

22. A system as claimed in claim 21 wherein the gains calculator is arranged to determine a gain indicating the estimate of a proportion of the first signal comprising the echo component.

23. A system as claimed in claim 20 wherein the estimation adapter arranged to adapt the estimation method by adapting the transfer function to indicate that an increasing proportion of the second signal is equivalent to the echo component.

24. A system as claimed in claim 22 wherein the estimation adapter is arranged to adapt the estimation method by adapting the gain such that the estimate of the echo component removed from the first signal is an increasing proportion of the second signal.

25. A computer program product comprising program code means which when executed by a computer implement the steps according to the method of claim 1.

26. A method for attenuating an echo component of a received signal, wherein the echo component is based on an echo path frequency response of a source signal, the method comprising:
estimating the echo path frequency response;
determining an estimate of the echo component based on the estimated echo path frequency response;
determining whether the first signal is overloaded; and attenuating the echo component of the received signal based on the determined echo component estimate, wherein when the determination is positive, forcing the estimated echo path frequency response to increase over time regardless of whether the echo path frequency response is decreasing over time.

* * * * *